J. FRIENDSHIP.
PLUMB AND CHALK LINE.
APPLICATION FILED MAR. 19, 1913.
1,098,033.
Patented May 26, 1914.
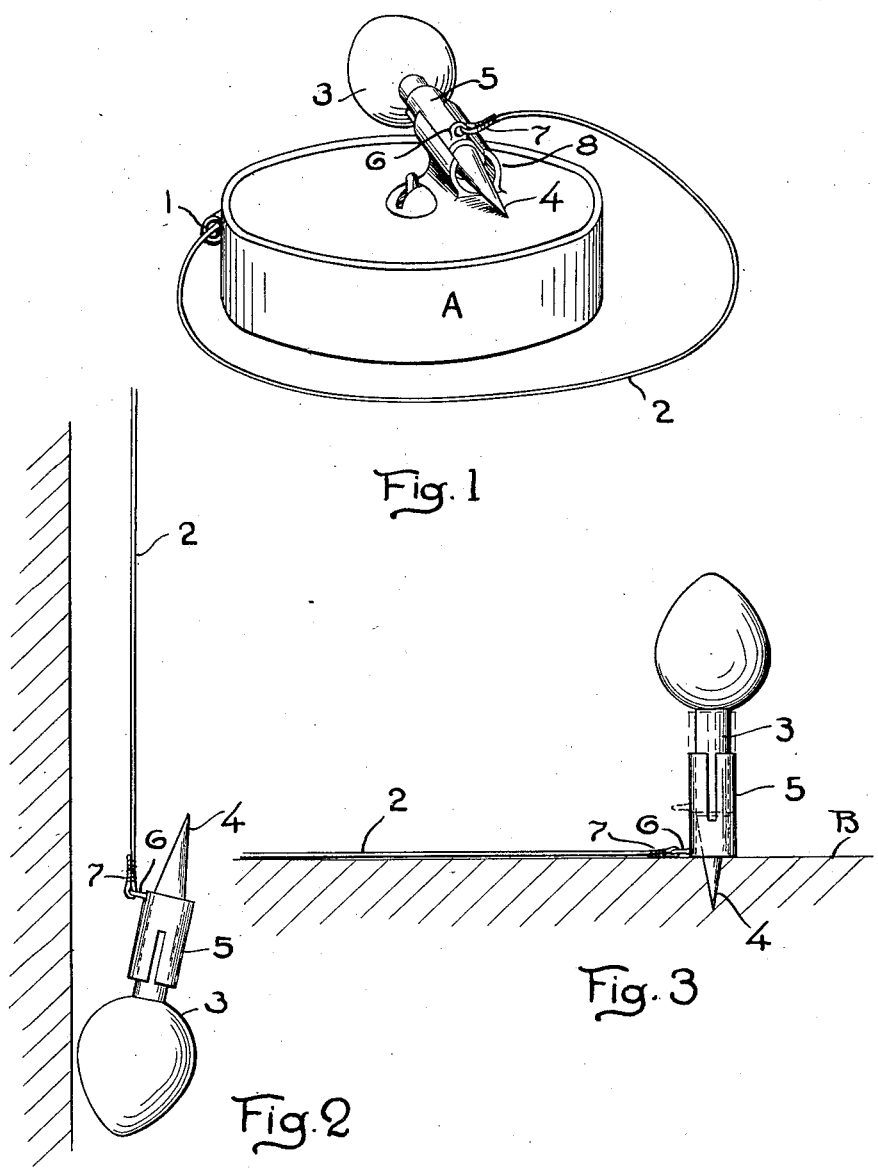

UNITED STATES PATENT OFFICE.

JOHN FRIENDSHIP, OF DETROIT, MICHIGAN.

PLUMB AND CHALK LINE.

1,098,033.  Specification of Letters Patent.  Patented May 26, 1914.

Application filed March 19, 1913. Serial No. 755,394.

*To all whom it may concern:*

Be it known that I, JOHN FRIENDSHIP, a citizen of the United States, residing at Detroit, county of Wayne, State of Michigan, have invented a certain new and useful Improvement in Plumb and Chalk Lines, and declare the following to be a full, clear, and exact description of the same, such as will enable others skilled in the art to which it pertains to make and use the same, reference being had to the accompanying drawings, which form a part of this specification.

This invention relates to combined plumb and chalk lines. It involves the idea of using a member which may interchangeably be used as the plumb-bob on a plumb-line and the fastening member for a chalk-line.

It further relates to improvements in a chalk-line embracing, among other improvements, a split sleeve which is adjustable along the securing member to bring the chalk-line to almost the plane upon which it is intended to mark, thereby bringing it to a position where it may be snapped to properly mark the surface and a position where tension on the chalk-line is least liable to bend over the securing member.

In the drawings:—Figure 1, is a perspective of the instrument. Fig. 2, shows its use as a plumb-line. Fig. 3, shows its use as a chalk-line.

A, represents a casing provided with an opening 1, through which a line 2 enters the interior of the casing. Within the casing is a drum (not shown) which is operated by a retracting spring (not shown) in the conventional way that tape-measures are retracted into the case and drawn out of the case. This specific construction is not a part of the invention.

On the end of the line 2 is a member 3 which may be interchangeably used as the fastening device for a chalk line or the plumb-bob for a plumb-line. This member comprises a globular head and an integral tapering stem which tapers to a sharp point 4. The member 3 is entirely independent of the line 2 and is fastened thereto by the frictional engagement of a split sleeve 5. This split sleeve has an eye 6 fastened at the side and extreme end. Through this eye the line 2 is looped and fastened as at 7. The split sleeve 5 has some resiliency by reason of being split and it will hold by a frictional engagement with the member 3.

Fig. 2, shows the member 3 used as a plumb-bob. It is of sufficient weight by reason of the globular head 3 and the thick stem to hang steadily when dropped from a position above. Line 2 then becomes a plumb-line by which the vertical may be ascertained.

Fig. 3, shows the use of the member 3 as a fastening device for a chalk line. The member 3 in this use becomes practically a thumb tack which, by reason of the sharp point 4, may be pushed into the surface B. When it has been pushed in to the desired depth to securely hold it, the split sleeve 5 may be pushed against the surface B. The eye 6 being at the extreme end of the sleeve 5, the line 2 will be held approximately against the surface B so that when the line is chalked and snapped, it will make a clear chalk line upon the surface B. It will also be noticed that any draw upon the line 2 will be communicated to the member 3 at a point with the least leverage so as to be the least liable to bend that member and pull it out or, in case the line 2 is being used for measuring, to alter the measurements so as to make them correct.

On one side of the case A, I employ a bracket 8 which is shown in the drawings as integral with the side of the casing, but which may be secured thereto in any desired manner. This bracket 8 is slightly tapering so that the member 3 with the split sleeve 5 may be wedged into it. Or, the bracket 8 may be in the nature of a spring clip which will hold the member 3. The bracket 8 is set obliquely to the casing A so that the point 4 will come against the side wall of the casing A or so near against it that this sharp point will be guarded to prevent its sticking into anybody or anything. The instrument may, therefore, be carried in the pocket without any danger or injury.

This instrument is especially adapted for carpenters, paper-hangers and decorators who often have occasion to use plumb-lines and also chalk-lines. It embodies, as already explained, devices by which both the vertical may be attained and a chalk mark made. The cord 2 may be looped over the tapered end of the member 4 if desired and the plumb-bob will then hang substantially straight. This is not necessary for the accuracy of the plumb-line, but some artisans prefer it.

What I claim is:—

A chalk line and holder, having in combination, a line, a fastening member provided with a stem having a sharp point, and a split sleeve adjustable frictionally along the stem and to the extreme end of which the line is attached, the attachment being at the end adjacent the pointed end of the stem, whereby the fastening member may be forced into a surface and then the split sleeve may be forced down against the surface to bring the chalk line into intimate relation with the surface and keep it there, substantially as described.

In testimony whereof, I sign this specification in the presence of two witnesses.

JOHN FRIENDSHIP.

Witnesses:
STUART C. BARNES,
AMELIA C. KOEHN.

Copies of this patent may be obtained for five cents each, by addressing the "Commissioner of Patents, Washington, D. C."